US012650749B2

(12) United States Patent
    Shen et al.

(10) Patent No.: US 12,650,749 B2
(45) Date of Patent: Jun. 9, 2026

(54) ELECTRONIC DEVICE AND METHOD FOR MANAGING TOUCH LATENCY

(71) Applicant: MEDIATEK INC., Hsinchu City (TW)

(72) Inventors: Yi-Hsin Shen, Hsinchu City (TW); Nien-Hsien Lin, Hsinchu City (TW); Yen-Po Chien, Hsinchu City (TW); Yen-An Shih, Hsinchu City (TW); Chiu-Jen Lin, Hsinchu City (TW); Cheng-Che Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/926,645

(22) Filed: Oct. 25, 2024

(65) Prior Publication Data

US 2025/0138676 A1      May 1, 2025

Related U.S. Application Data

(60) Provisional application No. 63/593,547, filed on Oct. 27, 2023.

(51) Int. Cl.
    *G06F 3/041* (2006.01)
    *G09G 3/20* (2006.01)
(52) U.S. Cl.
    CPC ......... *G06F 3/0418* (2013.01); *G09G 3/2092* (2013.01); *G09G 2340/0435* (2013.01); *G09G 2354/00* (2013.01)
(58) Field of Classification Search
    CPC .......... G06F 3/0418; G09G 2340/0435; G09G 2354/00; G09G 3/2092
    See application file for complete search history.

(56) References Cited

U.S. PATENT DOCUMENTS

| | | | | |
|---|---|---|---|---|
| 2012/0262463 A1* | 10/2012 | Bakalash | ................. | G09G 5/18 |
| | | | | 345/501 |
| 2013/0194195 A1* | 8/2013 | Parekh | ..................... | G09G 3/00 |
| | | | | 345/173 |
| 2015/0355774 A1* | 12/2015 | Johansson | ........... | G06F 3/04166 |
| | | | | 345/173 |
| 2016/0062535 A1* | 3/2016 | Nagasawa | ........... | G06F 3/04883 |
| | | | | 345/173 |
| 2016/0188088 A1* | 6/2016 | Rodrigues De Araujo | ................ | |
| | | | | G06F 3/04166 |
| | | | | 345/173 |
| 2020/0012408 A1* | 1/2020 | Drumm | ................. | G06F 3/0421 |
| 2022/0093056 A1* | 3/2022 | Macias | .................. | G09G 5/395 |

(Continued)

*Primary Examiner* — Hong Zhou
(74) *Attorney, Agent, or Firm* — McClure, Qualey & Rodack, LLP

(57) ABSTRACT

An electronic device including a display panel and a CPU is provided. The display panel updates displayed images at a refresh rate. The CPU implements a latency monitor, a system resource controller, a display controller, and an application. The latency monitor collects time information related to touch latency. The touch latency is the duration between the time point at which the display panel detects a touch event and the time point at which the display panel displays an image generated by the application in response to said touch event. The display controller informs the system resource controller of the refresh rate. The system resource controller adjusts the resource allocation of the electronic device to cause the touch latency to be lower than a threshold, according to the time information and the refresh rate.

16 Claims, 4 Drawing Sheets

(56) References Cited

U.S. PATENT DOCUMENTS

| | | | |
|---|---|---|---|
| 2022/0358894 A1 * | 11/2022 | Wang | G06T 15/503 |
| 2025/0104670 A1 * | 3/2025 | Vandanov | G09G 5/395 |

* cited by examiner

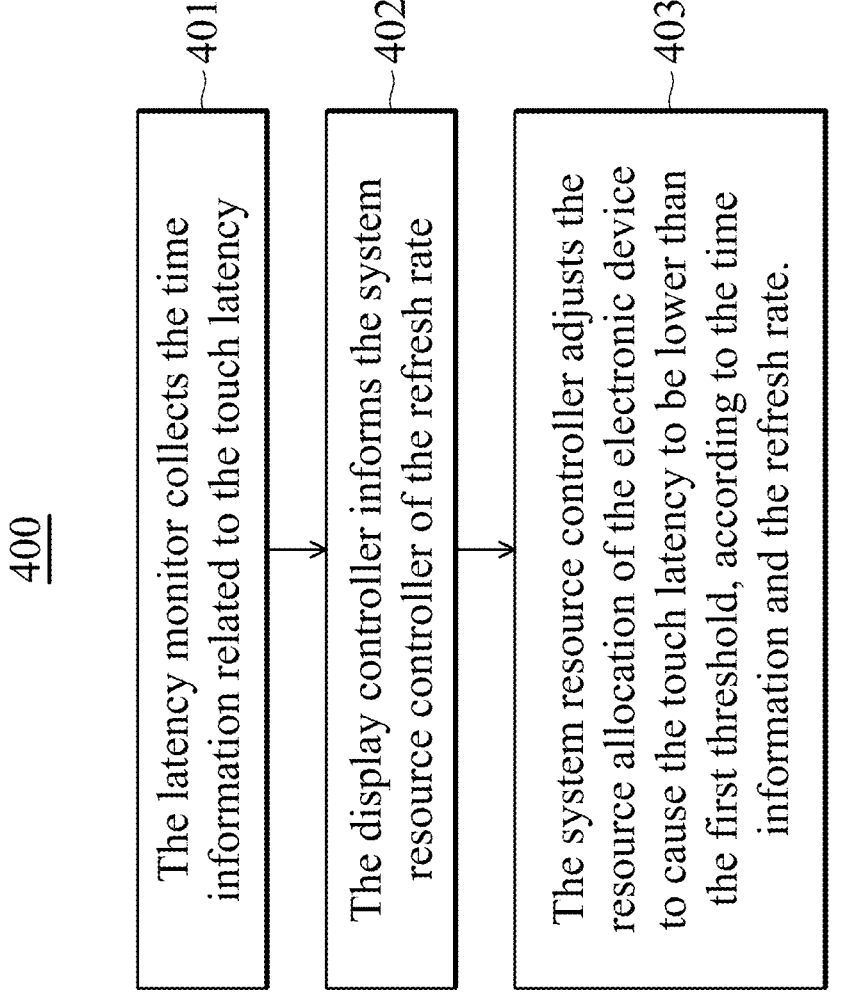

400

401
The latency monitor collects the time information related to the touch latency 402
The display controller informs the system resource controller of the refresh rate 403
The system resource controller adjusts the resource allocation of the electronic device to cause the touch latency to be lower than the first threshold, according to the time information and the refresh rate.

FIG. 4

ELECTRONIC DEVICE AND METHOD FOR MANAGING TOUCH LATENCY

CROSS REFERENCE TO RELATED APPLICATIONS

This application claims priority of U.S. Provisional Application Ser. No. 63/593,547, filed on 2023 Oct. 27, the entirety of which is incorporated by reference herein.

BACKGROUND OF THE INVENTION

Field of the Invention

The present invention relates to method for managing touch latency, and, in particular, to method for ensuring the touch latency is lower than a threshold.

Description of the Related Art

Touch latency is the time duration between the time point that the user touches the screen of a device and the time point that the device reacts to the user's action. Touch latency is an important aspect of user experience. Long touch latency will negatively affect the user experience. However, current systems do not have a mechanism to manage or adjust touch latency to ensure that the touch latency is low enough. Furthermore, when the frame rate of the application is higher than the refresh rate of the display, the touch latency will become long.

Thus, a method for managing touch latency is required to improve user experience.

BRIEF SUMMARY OF THE INVENTION

An embodiment of the present invention provides an electronic device. The electronic device comprises a display panel and a central processing unit (CPU). The display panel is configured to update displayed images at a refresh rate. The CPU is configured to implement a latency monitor, a system resource controller, a display controller, and an application. The latency monitor is configured to collect time information related to touch latency. The touch latency is the duration between the time point at which the display panel detects a touch event and the time point at which the display panel displays a first image generated by the application in response to the touch event. The display controller is configured to inform the system resource controller of the refresh rate. The system resource controller is configured to adjust the resource allocation of the electronic device to cause the touch latency to be lower than a first threshold, according to the time information and the refresh rate.

An embodiment of the present invention provides a method for managing touch latency. The method is applicable to an electronic device comprising a display panel configured to update displayed images at a refresh rate and a central processing unit (CPU) configured to implement a latency monitor, a system resource controller, a display controller, and an application. The method comprises collecting time information related to touch latency via the latency monitor. The touch latency is the duration between the time point at which the display panel detects a touch event and the time point at which the display panel displays a first image generated by the application in response to the touch event. The method further comprises informing the system resource controller of the refresh rate via the display controller. The method further comprises adjusting the resource allocation of the electronic device to cause the touch latency to be lower than a first threshold according to the time information and the refresh rate via the system resource controller.

BRIEF DESCRIPTION OF THE DRAWINGS

The present invention can be more fully understood by reading the subsequent detailed description and examples with references made to the accompanying drawings, wherein:

FIG. 4 is a flow diagram of a method for managing touch latency in accordance with the embodiments of the present disclosure.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
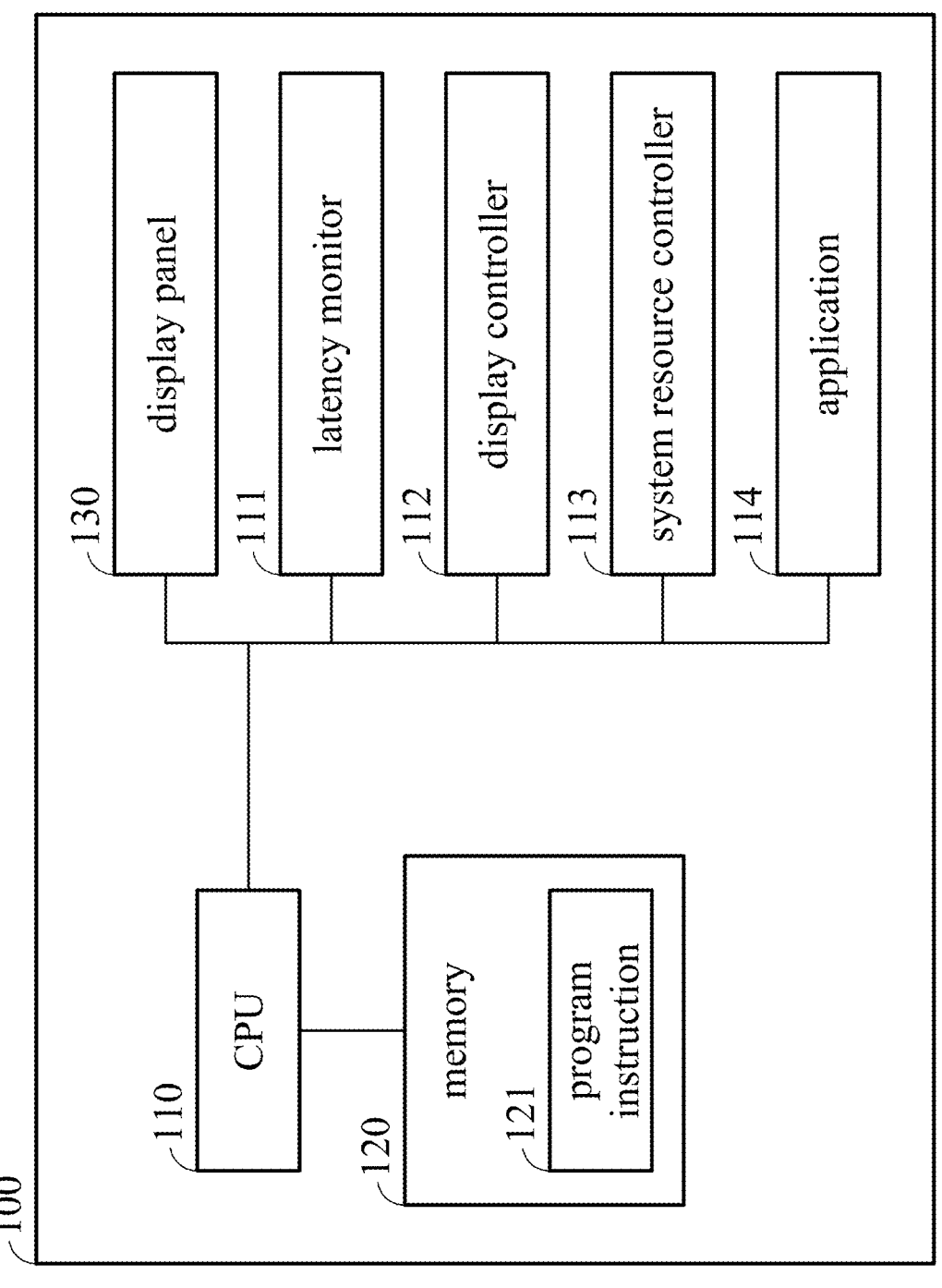
FIG. 1 is a block diagram of the electronic device in accordance to embodiments of the present disclosure.

Refer to FIG. 1, FIG. 1 is a block diagram of the electronic device 100 in accordance to embodiments of the present disclosure. The electronic device 100 may perform various functions to implement processes and methods described herein. For example, the electronic device 100 may be a smartphone, a wearable device, a tablet computer, a notebook computer, or a desktop computer. The electronic device 100 may be implemented in the form of one or more integrated-circuit (IC) chips such as, one or more processors. The electronic device 100 includes a central processing unit (CPU) 110, a memory 120, and a display panel 130.

The CPU 110 provides the required process and calculation capability to implement the method of the embodiments. For example, the CPU 110 may provide the process and calculation capability to perform operating systems, programs, software, modules, applications, and functions. In some embodiments, the CPU 110 may be implemented in the form of hardware with electronic components, such as transistors, diodes, capacitors, resistors, or inductors. These components are configured and arranged to achieve specific purposes in accordance with the embodiments of the present disclosure. For example, the CPU 110 may include a processor, a general purpose micro-processor, an application processor, a graphics processing unit (GPU), an image signal processor, a digital signal processor, and/or related chip set.

The memory 120 stores data required by the CPU 110. The memory 120 may include non-volatile memories, such as read only memory (ROM), flash memory, hard disk drive, and solid-state disk. The memory 120 may also include volatile memories, such as dynamic random access memory (DRAM) and static random access memory (SRAM). In some embodiments, the memory 120 stores at least one program instruction 121, such as computer-readable instruction. When the program instruction 121 is read and executed by the CPU 110, the program instruction 121 causes the CPU 11 to implement methods according to the embodiments of the present disclosure. The display panel 130 includes a touch screen. The display panel 130 is configured to display images and update the displayed images at a refresh rate. For a non-limiting example, the refresh rate may be 60, 90, or 120 Hz.

The CPU 110 is configured to implement a latency monitor 111, a display controller 112, a system resource controller 113, and an application 114. In some embodiments, the latency monitor 111, the display controller 112, the system resource controller 113, and the application 114 are software modules implemented by the CPU 110. For example, the CPU 110 is configured to drive program instruction 121 and implement these modules in order to execute methods of the present disclosure. In other embodiments, the latency monitor 111, the display controller 112, and the system resource controller 113 may be implemented in hardware circuits which are similar to CPU 110.

Figure 2:
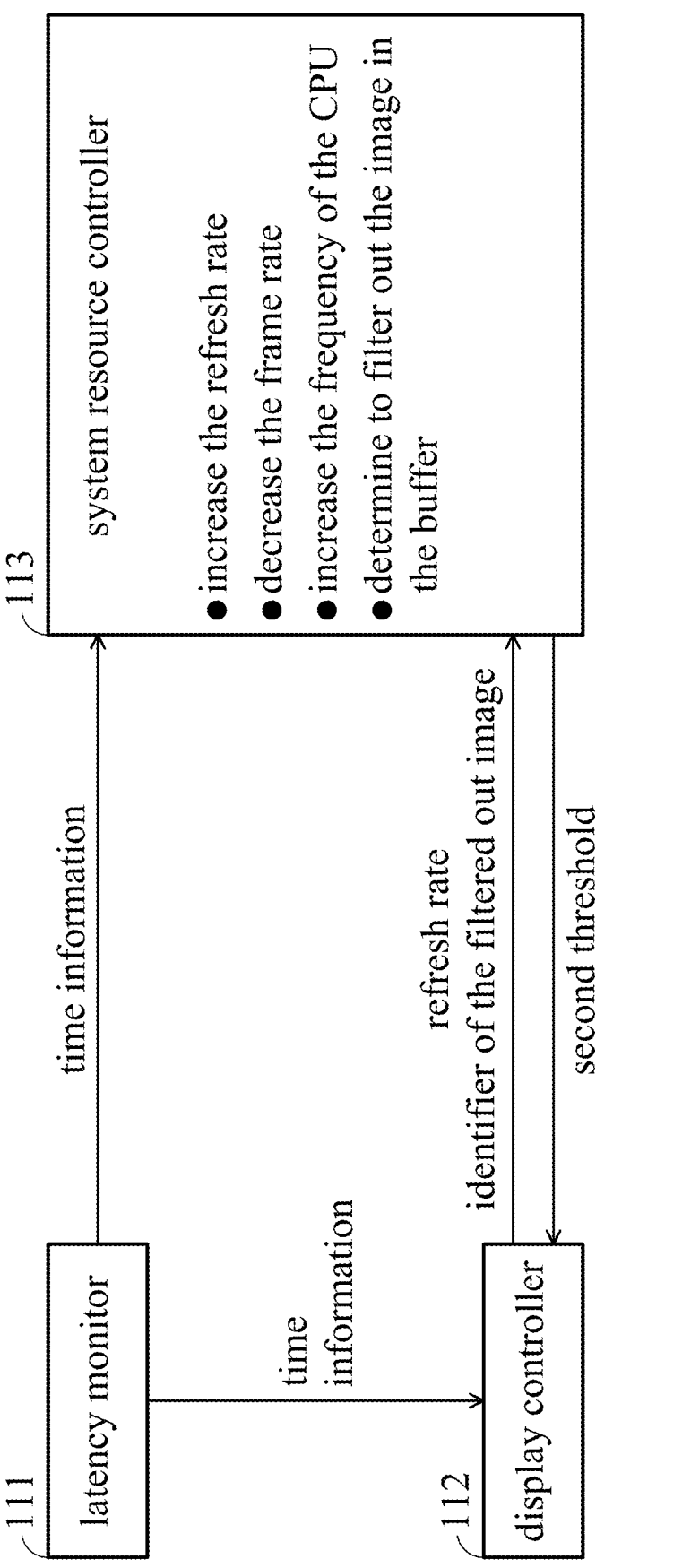
FIG. 2 is a schematic diagram illustrating the functions of the latency monitor, the display controller, and the system resource controller in accordance to embodiments of the present disclosure.

Refer to FIG. 2, FIG. 2 is a schematic diagram illustrating the functions of the latency monitor 111, the display controller 112, and the system resource controller 113 in accordance to embodiments of the present disclosure. The latency monitor 111 is configured to collect time information related to the touch latency. Touch latency is the duration between the time point at which the display panel 130 detects a touch event and the time point at which the display panel 130 displays an image (e.g. a first image) generated by the application 114 in response to said touch event. In other words, the touch latency is the duration between the time point at which the display panel 130 detects a touch event and the time point at which the image displayed on the display panel 130 is refreshed in response to the touch event. The touch event may be the user touching the display panel 130.

Figure 3:
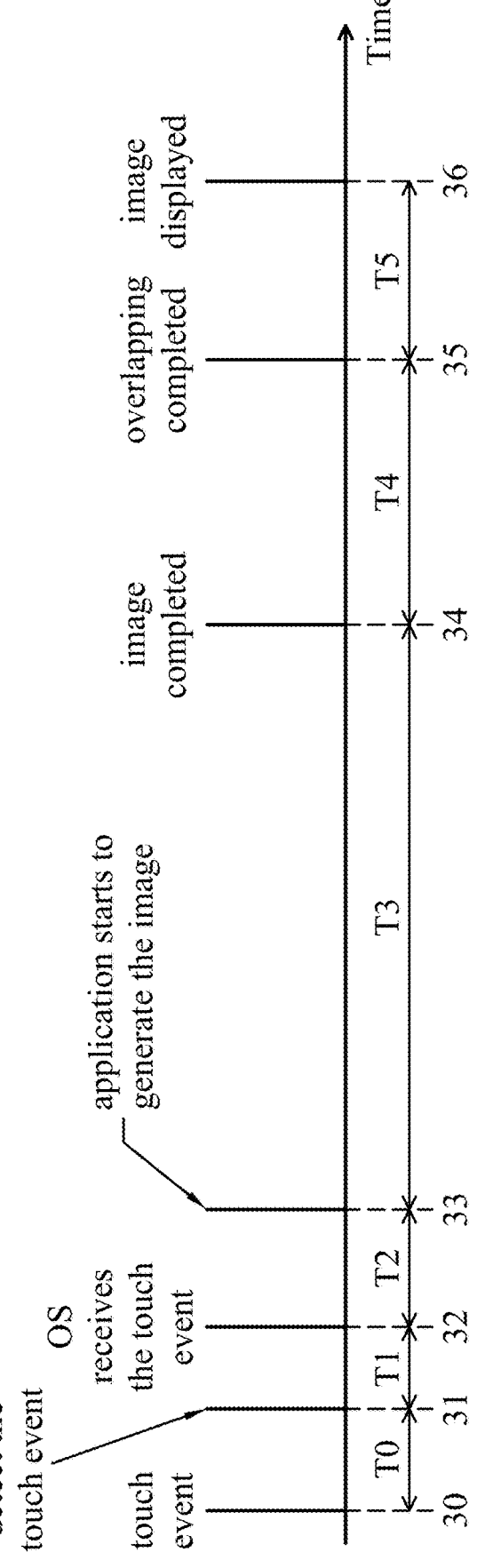
FIG. 3 is a schematic diagram illustrating the processes between detecting the touch event and displaying the image in response to the touch event, in accordance to embodiments of the present disclosure.

Specifically, refer to FIG. 3, FIG. 3 is a schematic diagram illustrating the processes between detecting the touch event and displaying the image in response to the touch event, in accordance to embodiments of the present disclosure. At time point 30, the user touches the display panel 130 (i.e. the touch event occurs). Then, the time interval T0 between the time point 30 and the time point 31 is a time interval for detecting the touch event (using the display panel 130). At time point 31, the display panel 130 detects the touch event. In some embodiments, the display panel 130 informs a kernel touch driver implemented using the CPU 110 the touch event. The time interval T1 between the time point 31 and the time point 32 is a time interval for reporting the touch event to the operating system (OS) of the electronic device 100 (e.g. using the kernel touch driver). In some embodiments, the kernel touch driver may transmit an indication which indicates the touch event to the OS. For a non-limiting example, the OS is Android system. The OS may also be other suitable operating systems, such as IOS system or Linux system.

At time point 32, the OS receives the indication indicating the touch event from the kernel touch driver. The time interval T2 between the time point 32 and the time point 33 is a time interval for dispatching the touch event to the application 114 (e.g. using the OS). At time point 33, the application 114 receives the touch event and starts to generate the image in response to receiving the touch event. The time interval T3 between the time point 33 and the time point 34 is a time interval for generating the image (the first image) using the application 114. At time point 34, the image is completed. The time interval T4 between the time point 34 and the time point 35 is a time interval for overlapping the generated image with other images (e.g. using a surface flinger and a hardware composer (HWC) of the electronic device 100). At time point 35, the overlapping is completed. The time interval T5 between the time point 35 and the time point 36 is a time interval for displaying the image on the display panel 130 (i.e. for refreshing the displaying contents of the display panel 130). At time point 36, the image (the first image) is displayed on the display panel 130.

Refer back to FIG. 2, the latency monitor 111 is configured to collect time information related to the touch latency and transmit the time information to the system resource controller 113 and the display controller 112. In some embodiments, the time information comprises at least one of the following: a timestamp of the touch event (e.g. the time point 31), the time point at which the operating system of the electronic device receives the touch event (e.g. the time point 32), the time point at which the application starts to generate the first image (e.g. the time point 33), the time point at which the first image is completed (e.g. the time point 34), and the time point at which the first image is displayed (e.g. the time point 36). In some embodiments, the time information comprises at least one of the time points 30~36.

The display controller 112 is configured to monitor the refresh rate of the display panel 130. The display controller 112 is also configured to inform the system resource controller 113 of the refresh rate. Specifically, the actual refresh rate of the display panel 130 may be slightly different from the set (or configured) refresh rate of the display panel 130 due to uncontrollable hardware variance. For example, the actual refresh rate may be 59.5 Hz, while the refresh rate of the display panel 130 is set to 60 Hz. The display controller 112 is configured to monitor the actual refresh rate of the display panel 130 and inform the system resource controller 113 of the actual refresh rate.

The system resource controller 113 is configured to adjust the resource allocation of the electronic device 100 to cause the touch latency to be lower than a first threshold, according to the time information and the refresh rate. The system resource controller 113 is configured to calculate the touch latency according to the time information. When the touch latency is higher than the first threshold, the system resource controller 113 is configured to adjust the resource allocation of the electronic device 100 to lower the touch latency. In some embodiments, the touch latency comprises a time interval for generating the first image using the application 114 after receiving the touch event (i.e. time interval T3). In some embodiments, the touch latency comprises a time interval for generating the first image using the application 114 after receiving the touch event (i.e. time interval T3). In some embodiments, the touch latency further comprises at least one of the following time intervals: the time interval for detecting the touch event (i.e. time interval T0), the time interval for reporting the touch event to the operating system of the electronic device 100 (i.e. time interval T1), the time interval for dispatching the touch event to the application 114 (i.e. time interval T2), the time interval for overlapping the first image with other images (i.e. time interval T4), and the time interval for displaying the first image on the display panel (i.e. time interval T5).

In some embodiments, the system resource controller 113 is configured to increase the refresh rate to decrease the touch latency. In some embodiments, the system resource controller 113 is configured to determine to increase the refresh rate in response to a determination that the refresh rate is lower than a predefined value. Specifically, when the actual refresh rate of the display panel 130 is lower than the configured refresh rate (i.e. the predefined value) of the display panel 130, the system resource controller 113 may determine to increase the refresh rate. Increasing the refresh rate enables the display panel 130 to refresh the displayed image more frequently (and shorten the time interval T5). Thus, increasing the refresh rate is able to shorten the touch latency.

In some embodiments, the system resource controller 113 is configured to decrease the frame rate of the application 114 to decrease the touch latency. Decreasing the frame rate can shorten the duration that the image has already been generated via the application 114 but has not been displayed on the display panel. Thus, decreasing the frame rate is able to shorten the touch latency. In some embodiments, the system resource controller 113 is further configured to increase the frequency of the CPU 110 to decrease the touch latency. Increasing the frequency of the CPU 110 can increase the frame rate of the application 114 and shorten the processing duration (especially, time interval T3).

In some embodiments, the electronic device 100 comprises a buffer. The buffer may be cooperated in the memory 120. The buffer is configured to store one or more second image which is generated by the application 114 and which has not been displayed on the display panel 130. The image which has already been generated by the application 114 but has not been displayed on the display panel 130 are stored in the buffer, waiting to be displayed. In some embodiments, the system resource controller 113 is configured to control the display controller 112 to filter out the one or more second image to decrease the touch latency, in response to a determination that the one or more second image has been stored in the buffer for a duration that exceeds a second threshold. In other words, if an image is stored in the buffer for a long time, the display controller 112 is configured to filter out that image. Filtering out the images which are stored in the buffer for a long time can guarantee the touch latency of the present frame (i.e. ensure the latest frame will be displayed in a short time).

In some embodiments, the display controller 112 is configured to inform the system resource controller 113 the count of the accumulated frames in the buffer. The display controller 112 is configured to receive the latency of each images in the buffer (i.e. the amount of time the image is stored in the buffer) from the latency monitor 111. The display controller 112 is further configured to filter out the accumulated frames in the buffer according to the latency of each images in the buffer and the second threshold under the control of the system resource controller 113.

In some embodiments, the display controller 112 is configured to inform the system resource controller 113 of the identifier of the second image (i.e. the identifier of the filtered out image). The system resource controller 112 is configured to calculate the actual frame rate of the application 114 based on the identifier and to adjust the second threshold based on the actual frame rate. Because some images are filtered out and does not be displayed, the actual frame rate of the application 114 is lower than the frame rate that the application 114 is set to. The system resource controller 112 is configured to calculate the actual frame rate according to the number of the filtered out images. When the actual frame rate is higher than a predefined value, the system resource controller 112 is configured to increase the second threshold to filter out more images. When the actual frame rate is lower than a predefined value, the system resource controller 112 is configured to decrease the second threshold to filter out less images. The system resource controller 112 is configured to inform the display controller 112 the second threshold.

In some embodiments, when the touch latency is higher than the first threshold, the system resource controller 112 first increases the refresh rate of the displayed panel 130. Then, if the touch latency is still higher than the first threshold after the refresh rate is increased, the system resource controller 112 decreases the frame rate of the application 114. Then, if the touch latency is still higher than the first threshold or if the frame rate becomes too low, the system resource controller 112 increases the frequency of the CPU 110. Finally, if the touch latency is still higher than the first threshold after the frequency of the CPU 110 is increased, the system resource controller 112 controls the display controller 112 to filter out the image in the buffer, in response to a determination that the image has been stored in the buffer for a duration that exceeds a second threshold.

FIG. 4 is a flow diagram of a method 400 for managing touch latency in accordance with the embodiments of the present disclosure. The method 400 can be implemented in the electronic device 100. In operation 401, the latency monitor 111 collects the time information related to the touch latency. Touch latency is the duration between the time point at which the display panel 130 detects a touch event and the time point at which the display panel 130 displays a first image generated by the application 114 in response to said touch event. In operation 402, the display controller 112 informs the system resource controller 113 of the refresh rate. In operation 403, the system resource controller 113 adjusts the resource allocation of the electronic device 100 to cause the touch latency to be lower than the first threshold, according to the time information and the refresh rate.

An electronic device and a method for managing touch latency are provided. The electronic device and the method are able to collect information associated to the touch latency, information associated to the actual refresh rate of the display panel, and information associated to the image which is generated but has not been displayed. The electronic device and the method are able to ensure the touch latency to be lower than the threshold through adjusting the resource allocation of the electronic device according to the collected information. The resource allocation of the electronic device may include the refresh rate of the display panel, the frame rate of the application, the frequency of the CPU, and the number of the image stored in the buffer. Thus, the electronic device and the method is able to improve the user experience, While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a display panel, configured to update displayed images at a refresh rate;
   a central processing unit (CPU), configured to implement a latency monitor, a system resource controller, a display controller, and an application; and
   a buffer, configured to store one or more second image which is generated by the application and has not been displayed on the display panel;
   wherein:
   the latency monitor is configured to collect a time information related to a touch latency, wherein the touch latency is a duration between a time point at which the display panel detects a touch event and a time point at which the display panel displays a first image generated by the application in response to the touch event;

the display controller is configured to inform the system resource controller of the refresh rate; and the system resource controller is configured to adjust resource allocation of the electronic device to cause the touch latency to be lower than a first threshold, according to the time information and the refresh rate;

the system resource controller is further configured to control the display controller to filter out the one or more second image to decrease the touch latency, in response to a determination that the one or more second image has been stored in the buffer for a duration that exceeds a second threshold;

the display controller is further configured to inform the system resource controller of an identifier of the second image;

the system resource controller is further configured to calculate an actual frame rate of the application based on the identifier and to adjust the second threshold based on the actual frame rate.

2. The electronic device as claimed in claim 1, wherein the system resource controller is further configured to increase the refresh rate to decrease the touch latency.

3. The electronic device as claimed in claim 2, wherein the system resource controller is further configured to determine to increase the refresh rate in response to a determination that the refresh rate is lower than a predefined value.

4. The electronic device as claimed in claim 1, wherein the system resource controller is further configured to decrease a frame rate of the application to decrease the touch latency.

5. The electronic device as claimed in claim 1, wherein the system resource controller is further configured to increase a frequency of the CPU to decrease the touch latency.

6. The electronic device as claimed in claim 1, wherein the touch latency comprises a time interval for generating the first image using the application after receiving the touch event.

7. The electronic device as claimed in claim 6, wherein the touch latency further comprises at least one of a time interval for detecting the touch event, a time interval for reporting the touch event to an operating system of the electronic device, a time interval for dispatching the touch event to the application, a time interval for overlapping the first image with other images, and a time interval for displaying the first image on the display panel.

8. The electronic device as claimed in claim 1, wherein the time information comprises at least one of a timestamp of the touch event, a time point at which an operating system of the electronic device receives the touch event, a time point at which the application starts to generate the first image, a time point at which the first image is completed, and a time point at which the first image is displayed.

9. A method for managing touch latency, wherein the method is applicable to an electronic device, wherein the electronic device comprises a display panel configured to update displayed images at a refresh rate, a central processing unit (CPU) configured to implement a latency monitor, a system resource controller, a display controller, and an application, and a buffer configured to store one or more second image which is generated by the application and has not been displayed on the display panel;

wherein the method comprises:

collecting, via the latency monitor, a time information related to a touch latency, wherein the touch latency is a duration between a time point at which the display panel detects a touch event and a time point at which the display panel displays a first image generated by the application in response to the touch event;

informing, via the display controller, the system resource controller of the refresh rate;

adjusting, via the system resource controller, resource allocation of the electronic device to cause the touch latency to be lower than a first threshold, according to the time information and the refresh rate;

controlling, via the system resource controller, the display controller to filter out the one or more second image to decrease the touch latency, in response to a determination that the one or more second image has been stored in the buffer for a duration that exceeds a second threshold;

informing, via the display controller, the system resource controller of an identifier of the second image; and calculating, via the system resource controller, an actual frame rate of the application based on the identifier and to adjust the second threshold based on the actual frame rate.

10. The method as claimed in claim 9, wherein the method further comprises:

increasing, via the system resource controller, the refresh rate to decrease the touch latency.

11. The method as claimed in claim 10, wherein the method further comprises:

determining, via the system resource controller, to increase the refresh rate in response to a determination that the refresh rate is lower than a predefined value.

12. The method as claimed in claim 9, wherein the method further comprises:

decreasing, via the system resource controller, a frame rate of the application to decrease the touch latency.

13. The method as claimed in claim 9, wherein the method further comprises:

increasing, via the system resource controller, a frequency of the CPU to decrease the touch latency.

14. The method as claimed in claim 9, wherein the touch latency comprises a time interval for generating the first image using the application after receiving the touch event.

15. The method as claimed in claim 14, wherein the touch latency further comprises at least one of a time interval for detecting the touch event, a time interval for reporting the touch event to an operating system of the electronic device, a time interval for dispatching the touch event to the application, the time interval for overlapping the first image with other images, and a time interval for displaying the first image on the display panel.

16. The method as claimed in claim 9, wherein the time information comprises at least one of a timestamp of the touch event, a time point at which an operating system of the electronic device receives the touch event, a time point at which the application starts to generate the first image, a time point at which the first image is completed, and a time point at which the first image is displayed.

* * * * *